(12) United States Patent
Sugata (10) Patent No.: US 6,437,250 B2
(45) Date of Patent: Aug. 20, 2002

(54) CABLE REEL STRUCTURE

(75) Inventor: Shoichi Sugata, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/832,805

(22) Filed: Apr. 12, 2001

(30) Foreign Application Priority Data

Apr. 14, 2000 (JP) ......................................... 2000-112997

(51) Int. Cl.[7] .................................................. H01B 7/00
(52) U.S. Cl. .......................... 174/135; 439/15; 439/164; 242/388
(58) Field of Search ................................ 174/50, 65 R, 174/135

(56) References Cited

U.S. PATENT DOCUMENTS

| 5,226,831 A | | 7/1993 | Horiuchi | |
|---|---|---|---|---|
| 5,286,219 A | | 2/1994 | Ueno et al. | |
| 5,562,466 A | * | 10/1996 | Kato et al. | 439/164 |
| 5,645,441 A | * | 7/1997 | Okuhara et al. | 439/164 |
| 5,962,813 A | * | 10/1999 | Shirako et al. | 439/15 |
| 6,007,355 A | * | 12/1999 | Shibata et al. | 439/164 |
| 6,059,591 A | * | 5/2000 | Bolen et al. | 439/164 |
| 6,099,331 A | * | 8/2000 | Kikkawa et al. | 439/164 |
| 6,109,942 A | * | 8/2000 | Bannai | 439/164 |
| 6,116,930 A | * | 9/2000 | Sakata | 439/164 |
| 6,228,425 B1 | * | 5/2001 | Sakata et al. | 439/15 |
| 6,309,233 B1 | * | 10/2001 | Nakade et al. | 439/164 |

* cited by examiner

*Primary Examiner*—Chau N. Nguyen
*Assistant Examiner*—Adolfo Nino
(74) *Attorney, Agent, or Firm*—Greenblum & Bernstein, P.L.C.

(57) ABSTRACT

A flat cable containing several conductor elements and corresponding bus bars are provided. An end portion of each conductor element is welded to a first end portion of each bus bars. A second end portion of each of the bus bars is formed into a terminal. Meanwhile, a cable reel includes a mobile member and a fixed member. At least one of the mobile member and the fixed member is provided with a connector unit having an outward opening. The terminal of each of the bus bars extends in the connector unit through a terminal path hole, while a terminal of an outside electrical cable is inserted into the connector unit through the outward opening of the connector unit, so that the bus-bar terminal and the electrical cable terminal are fitted and connected to each other.

19 Claims, 7 Drawing Sheets

CABLE REEL STRUCTURE

BACKGROUND OF THE INVENTION

1. Field of the Invention

The present invention generally pertains to a cable reel mounted in a vehicle steering system, e.g. for automobiles. More particularly, the invention relates to a cable reel that includes a torus-shaped enclosure, defined by a fixed member (base shell) fitted with a column switch, and a mobile member (rotor) coupled with a steering wheel and mounted with the fixed member in a freely rotatable manner. The torus-shaped enclosure contains a flat cable stored in a spiraled condition. The flat cable is wound or unwound in the cable reel, in conjunction with the rotation of the rotor. The invention also concerns an improvement in a connecting structure, in which conductor elements of the flat cable are connected to external electrical systems, e.g. an airbag system.

2. Description of Background Information

Figure 1:
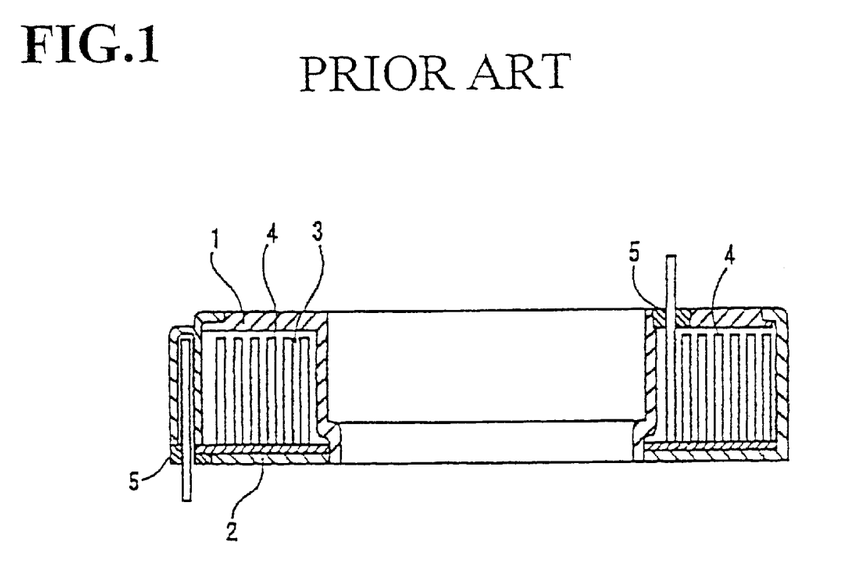
FIG. 1 is a cross-sectional side view of a prior art cable reel.
Figure 2A:
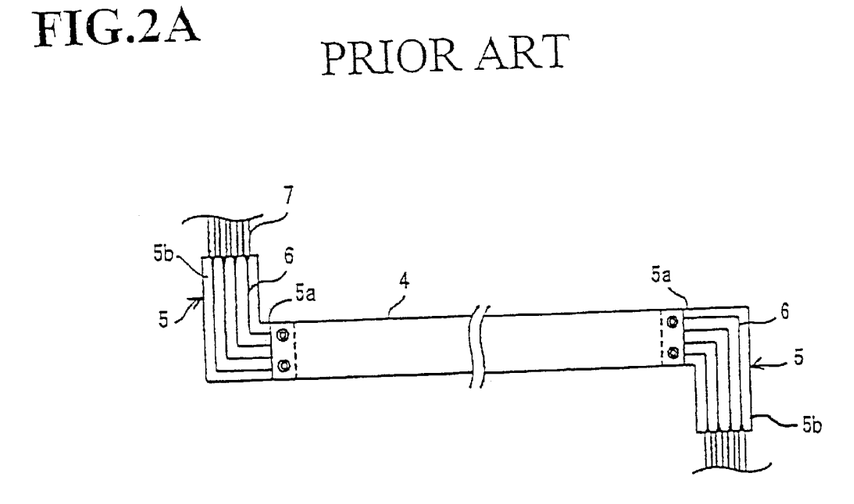
FIG. 2A and FIG. 2B show the configuration respectively, before and after a cover is capped.
Figure 2B:
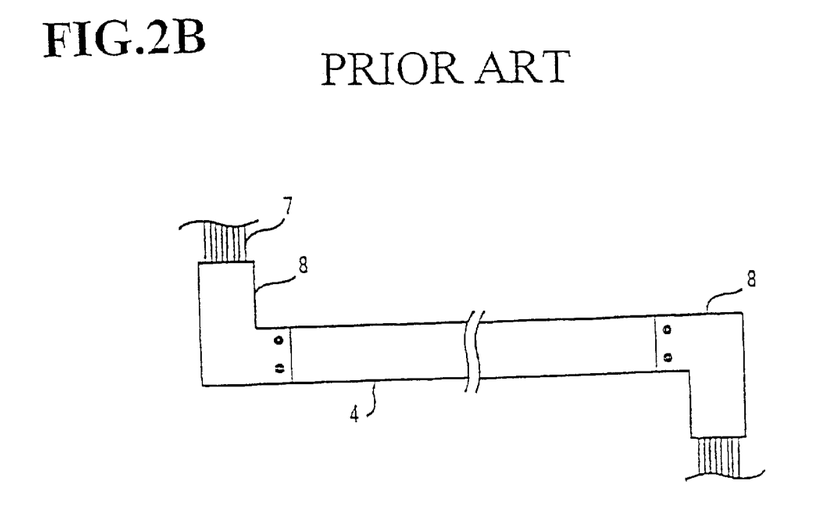

As shown in FIG. 1, a prior art cable reel includes a torus-shaped enclosure 3 including a rotor 1 which rotates in conjunction with a steering wheel, and a base shell 2 immobilized with a fixed axis which is positioned in a vehicle body side. The torus-shaped enclosure contains a flat cable 4 in a spiraled condition. The flat cable 4 usually includes several conductor elements. In the prior art, there are also provided so-called "inner cases" that are formed into L-shape. Each inner case 5 contains narrow-width bus bars 6 (FIG. 2A) having first and second end portions. The bus bars are mutually aligned in the inner case and fixed therein. The inner cases 5 are then fixed to the rotor and/or to the base case. Two longitudinal end portions of the flat cable 4 are stripped of their coating material, so that the conductor elements are exposed at those end portions. Likewise, there are also provided outside electrical cables 7, each having an end portion stripped of its coatings, so as to yield a cable end portion. As shown in FIGS. 2A and 2B, the first end portion of each bus bar 6 of the inner case 5 is weld connected to the conductor elements of the flat cable, while the second end portion thereof is weld connected to the cable end portions of the outside electrical cables.

The above inner case 5, located at each side of the flat cable 4, includes a first leg portion 5a which extends, when in use, parallel to the conductor elements of the flat cable 4, and a second leg portion 5b perpendicular to the direction of the conductor elements of the flat cable 4. The first and second leg portions 5a and 5b carry the bus bars, which are bent along the two leg portions 5a and 5b and fixed thereon. The conductor elements at one end portion of the flat cable 4 are superposed on the bus bars 6 carried on the first leg portion 5a, and fixed thereon by classical or ultrasonic welding. Likewise, the bared end portions of the electrical cables 7 are superposed on the bus bars 6 carried on the second leg portion 5b, and fixed thereon by a similar welding method.

When the conductor elements and the electrical cables 7 are bonded to the bus bars 6 of the inner case 5, a cover 8 (FIG. 2b) is placed on the inner case 5, so that the end portion of the flat cable 4 and that of the electrical cables 7 are held by the inner case 5 and the cover 8.

The inner case 5 and the cover 8 flanking the end portion of the flat cable are then fitted into the enclosure formed by the rotor (mobile member 1) and the base shell (fixed member 2).

The flat cable 4 and the electrical cables 7 are thus bonded to the respective end portions of the bus bars 6. However, the flat cable 4 and the electrical cables 7 have different welding characteristics. Accordingly, when the flat cable 4 and the electrical cables 7 are welded to the bus bars 6, they require their specific horn and anvil to be equipped in the welding machine. This increases installation costs. Moreover, as the horns and anvils mounted on the welding machine must be exchanged, welding operation is very cumbersome.

Besides, as is already mentioned, the electrical cables are welded to the bus bars. Accordingly, once they are fixed, it is very difficult to rearrange the connection configuration.

SUMMARY OF THE INVENTION

In view of solving such problems, an object of the invention is to provide a cable reel, for which equipment costs less and in which connections of the electrical cables can be rearranged or modified very easily.

To this end, there is provided a cable reel structure including a fixed member, a mobile member mounted thereto, and a flat cable including conductor elements, an end portion of which is exposed, the cable reel structure being configured to receive an electrical cable having a cable terminal.

In the above structure, there are provided bus bars respectively having first and second end portions, the first end portion of each of the bus bars being fixed to a respective one of the conductor elements, the second end portion of each of the bus bars forming a bus-bar terminal.

At least one of the mobile member and the fixed member includes a corresponding connector unit having an outward opening, such that the bus-bar terminal extends through the connector unit, and the connector unit is configured to receive the cable terminal through the outward opening, such that the cable terminal can be connected to the bus-bar terminal.

The cable reel structure may further include a torus-shaped enclosure defined by the fixed member and the mobile member mounted thereto in a freely rotatable way, the torus-shaped enclosure containing a flat cable such that the flat cable can be wound or unwound in conjunction with the rotation of the mobile member.

Preferably, the bus-bar terminal is a tab-type male terminal, and the cable terminal is a female terminal press-fitted on the electrical cable.

Typically, the connector unit includes a lance and/or a retainer, configured to hold the cable terminal.

Preferably yet, the bus bars are insert-molded in a suitable resin material, and the first end portion of each of the bus bars is fixed to each of the conductor elements of the flat cable by welding, such that the second end portion of each of the bus bars forms a bus-bar terminal which projects from the resin material.

Suitably, the electrical cable to be connected to the bus-bar terminal is an electrical cable incorporated in an airbag system.

In the above construction, the outside electrical cables are not welded directly to the bus bars. Instead, the bus bars are provided with terminals, and these terminals extend into, and through, a connector unit which is formed together with the rotor and/or the base shell. The terminal of each of the bus bars is then fitted with the terminal connected to the end portion of each of the electrical cables, so that the configuration of electrical cables can be rearranged easily. Further, the bus bars are welded only to the conductor elements imbedded in the flat cable. Accordingly, a welding machine for such a cable reel needs only a single horn and anvil which are used for welding the bus bars to the flat cable. Welding operation thus becomes easier, and equipment costs are lowered.

Further, when the bus-bar terminals are formed into tab shapes, the structure or configuration of the bus bars may be greatly simplified.

Preferably, an adapter case made of a suitable resin material is formed unitarily and in one piece with the flat cable. This adapter case is then fitted into the torus-shaped enclosure defined by the rotor and/or the base shell, such that the terminal of each of the bus bars projects into the connector unit through the terminal path hole. The connector unit further includes at least one hooking device, e.g. a lance, for holding the terminal of each of the electrical cables, after the latter is fitted with the corresponding bus-bar terminal. The electrical cable terminals are thus fixedly locked with the bus bars. Furthermore, the connector unit includes a retainer which serves as a second hooking device. The bus-bar and cable terminals are thus doubly locked, so that electrical connections can be established far more reliably.

When the inventive cable reel structure is applied to an airbag system, an electrical cable connected to an airbag is fitted into the connector unit located at the side of the rotor, while an electrical cable connected to an airbag control unit is fitted into the connector unit located at the side of the base shell. Typically, electrical connections in the airbag system must satisfy a stringent reliability requirement. To respond to this requirement, the bus-bar terminal and the cable terminal are now inserted directly into the connector unit and connected therein, instead of the connectors themselves being fitted with each other, and thus their terminals being connected to each other.

In such a construction, when the bus-bar terminal welded to the flat cable is not correctly fitted into the connector unit, rotation of the mobile member will generate rattling noises. This phenomenon gives another advantage of detecting mismatching of the bus-bar terminal.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which:

FIGS. 2A and 2B show a connecting configuration of a flat cable and electrical cables with bus bars, known in the prior art, where

DETAILED DESCRIPTION OF THE PREFERRED EMBODIMENTS

FIGS. 3 to 7 show the preferred embodiments of the present invention, in which the concept of the invention is applied to a cable reel mounted into a steering system for vehicles.

Figure 3:
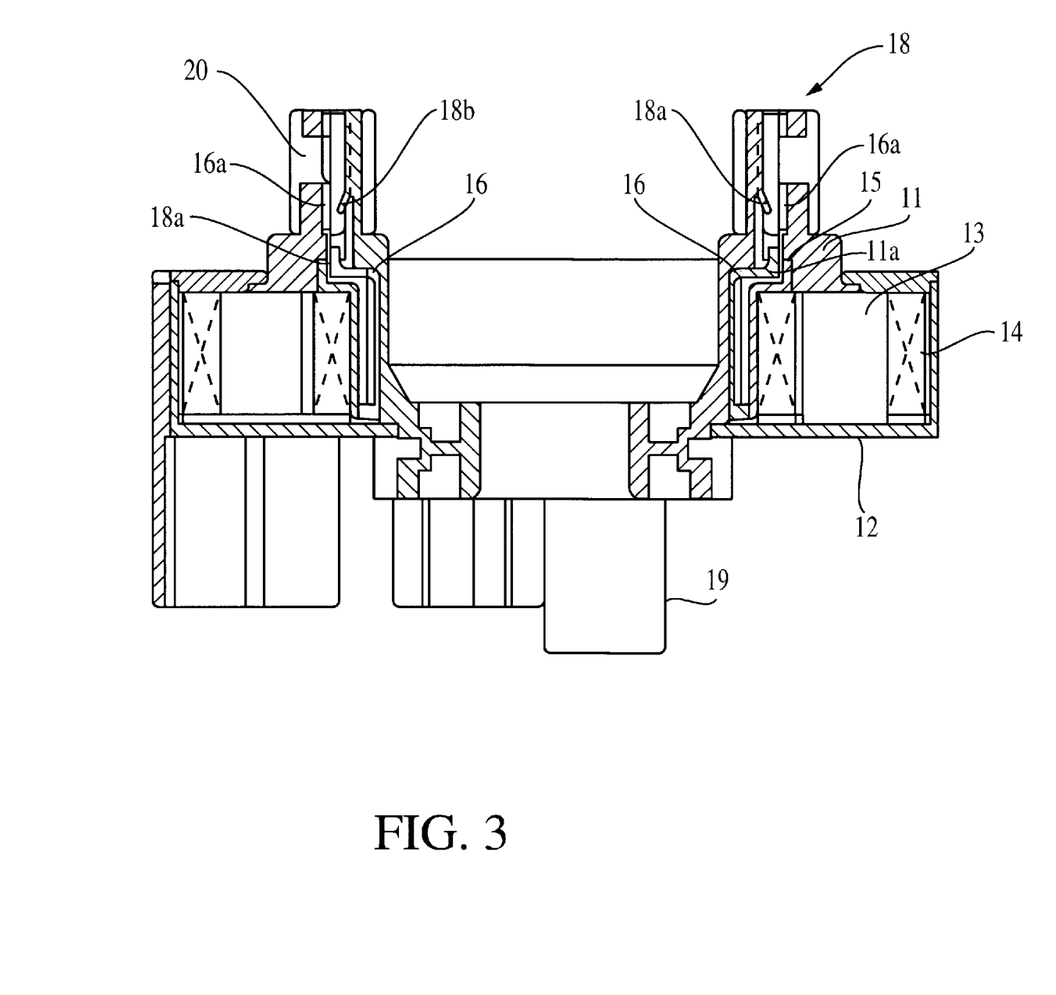
FIG. 3 is a cross-sectional side view of a cable reel according to the invention.
Figure 4:
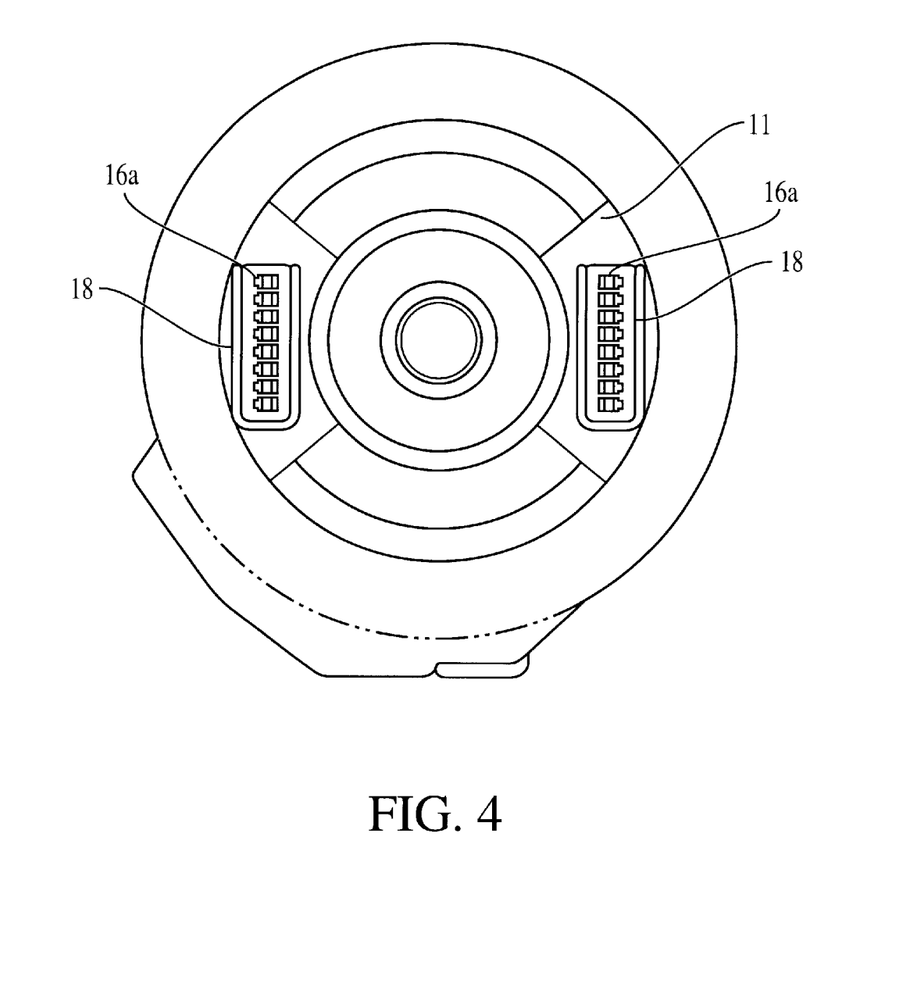
FIG. 4 is a top plan view of the cable reel of FIG. 3.
Figure 5:
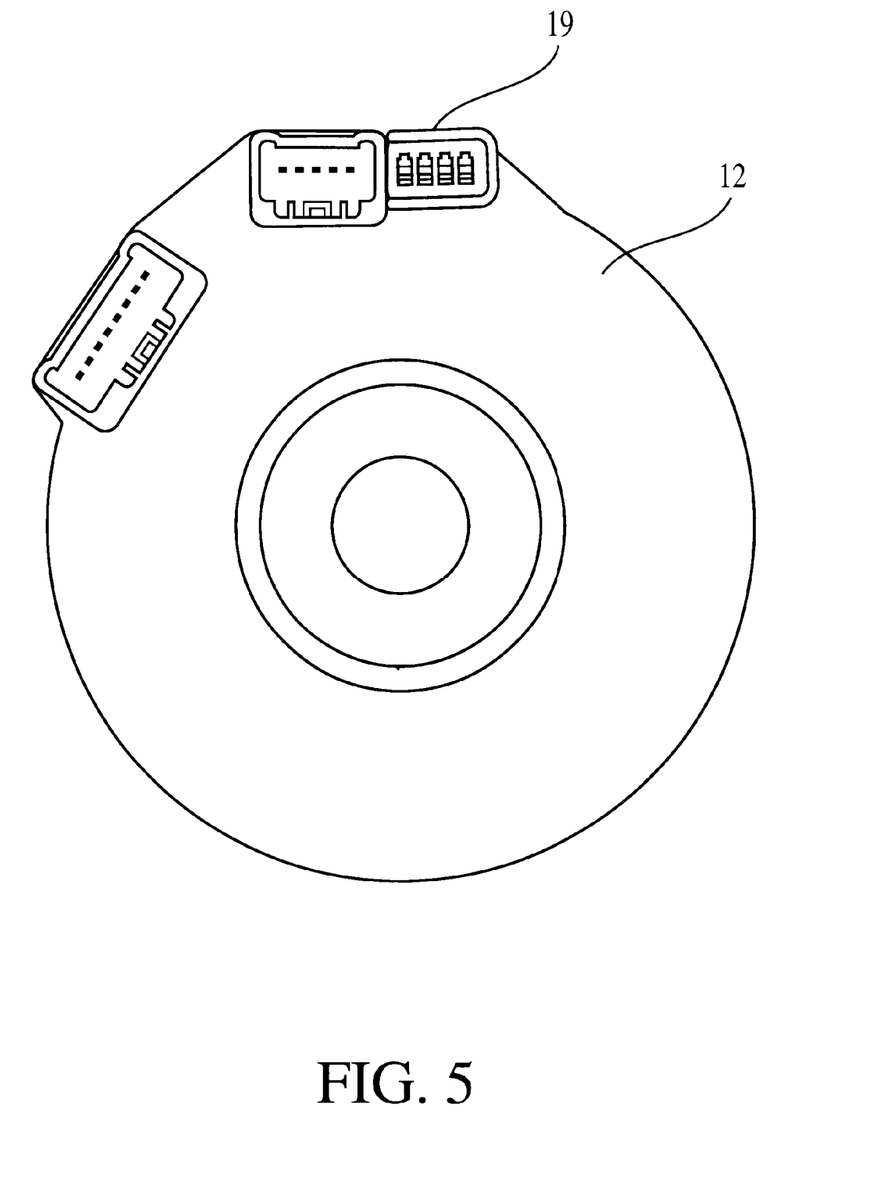
FIG. 5 is a bottom plan view of the cable reel of FIG. 3.

A cable reel includes a torus-shaped enclosure 13 defined by a rotor (mobile member) 11 rotating in conjunction with a steering wheel, and a base shell (fixed member) 12 fixed to the immobilized axis placed at the side of a vehicle body. The torus-shaped enclosure 13 stores a flat cable 14 in a spiraled state. As shown in FIG. 3, the rotor 11 and the base shell 12 respectively form corresponding first and second enclosures 11a defined by their internal circular faces (only the first enclosure is shown in detail in FIG. 3). The first (or second) enclosure 11a fixedly contains an adapter case 15, into which first (or second) bus bars 16 are insert-molded. The flat cable 14 has two longitudinal end portions. One of these end portions is weld bonded to the inner end (near the cable reel) of the first bus bars 16 provided in the first enclosure 11a at the rotor side, while the other end portion is weld bonded to the inner end (near the cable reel) of the second bus bars 16 provided in the second enclosure 11a at the base-shell side.

Figure 6:
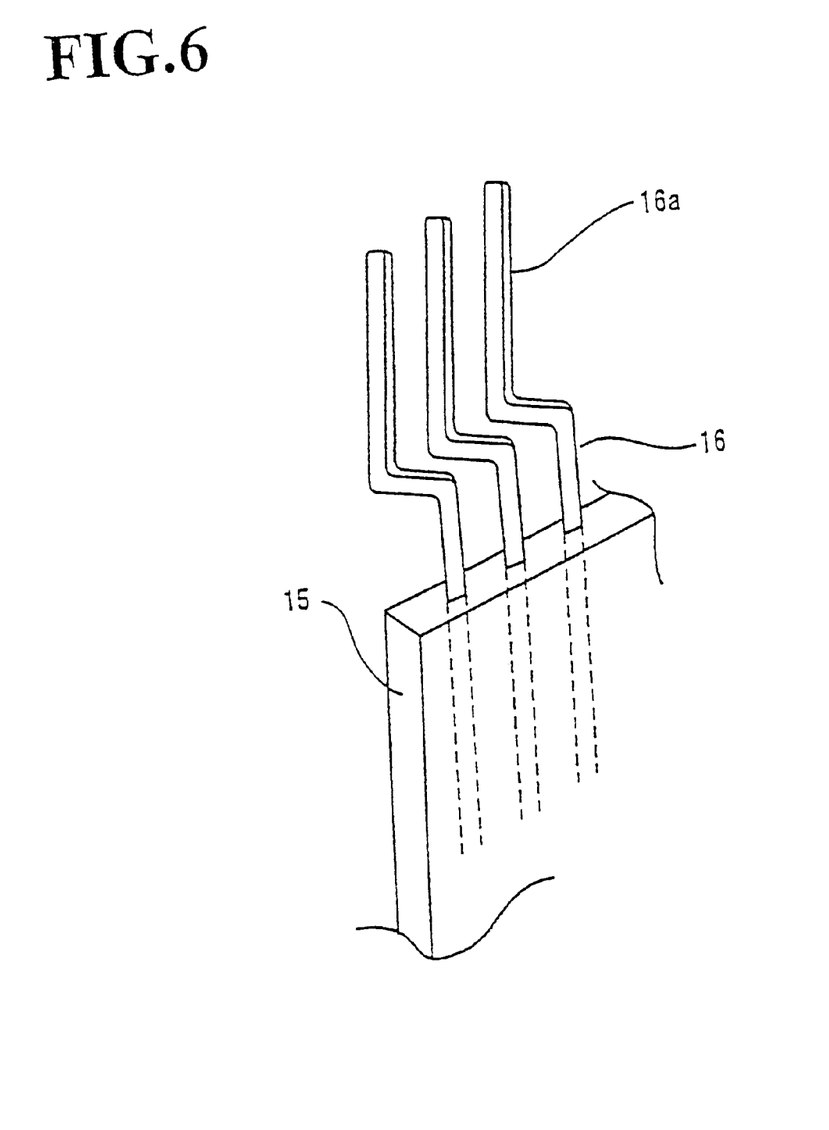
FIG. 6 is a perspective view of bus bars to be connected to a flat cable.

As shown in FIG. 6, the first (or second) bus bars 16 are molded in the adapter case 15 in an aligned condition and in parallel relation to each other. One end of each bus bar 16 is bonded by welding to a corresponding conductor element, which is exposed by stripping one end of the flat cable 14 of its coating. Each bus bar 16 projects from the adapter case 15, and the protruding end portion is provided with a tab 16a, which serves as a male terminal.

Figure 7A:
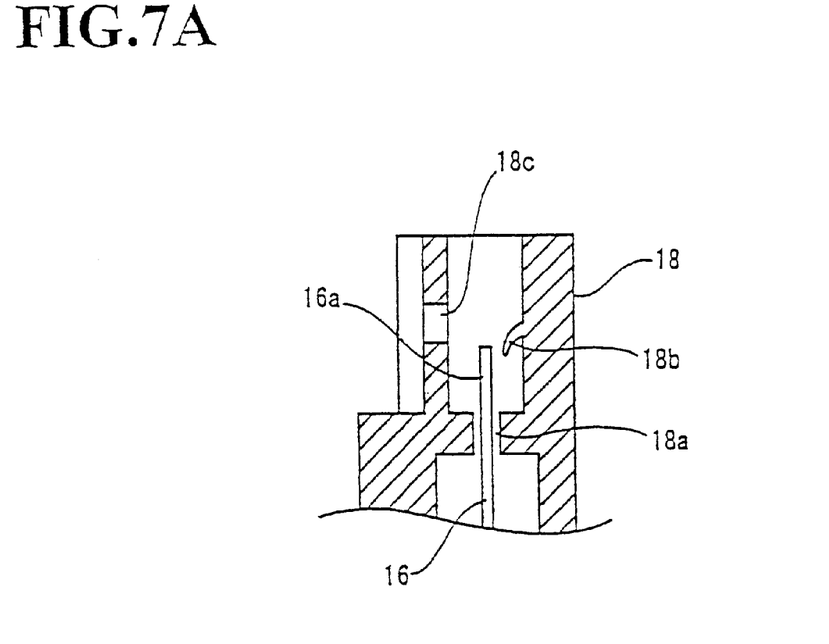
FIGS. 7A and 7B are cross-sectional side views of a connector unit provided in the cable reel of the present invention, in which FIG. 7A and FIG. 7B respectively show the configuration before and after an electrical cable terminal and a retainer are fitted into the connector unit.
Figure 7B:
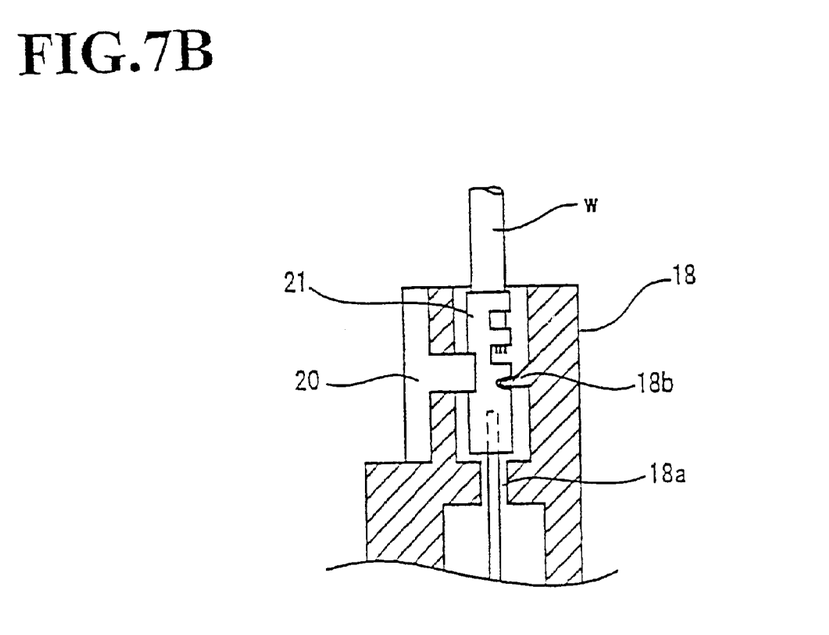

The rotor 11 includes a first connector unit 18 projecting upwardly therefrom and formed unitarily and in one piece therewith, while the base shell 12 includes a second connector unit 19 projecting downwardly therefrom and integrally formed therewith. The base portion of the first and second connector units 18 and 19 has a terminal path hole 18a (not shown for the second connector unit 19). The tab 16a of the bus bars 16 extends through this terminal path hole 18a. The inner surface of each connector unit 18 or 19 is provided with a lance 18b for hooking the inserted terminal, while the peripheral wall of the each connector unit 18 or 19 is provided with an opening 18c for inserting a retainer 20 (FIG. 7B). Although only the first connector unit 18 has been described in detail with respect to FIGS. 7A and 7B, it should be apparent to the ordinarily skilled artisan that the second connection unit 19 is configured to be substantially identical to the first connector unit 18 shown in FIGS. 7A and 7B.

The connector unit 18 is inserted with a female terminal 21 connected to the end portion of an electrical cable w incorporated into an airbag system, so that the female terminal 21 is connected to the tab 16a (male terminal) of the bus bar 16. In this manner, the female terminal 21 connecting to the electrical cable w is hooked first by the lance 18b, then by the retainer 20, both provided in the connector unit 18.

The bus bars are welded only with the conductor elements of the flat cable, and not with the electrical cables. Accordingly, the electrical cables can be easily rearranged. Further, the welding machine is equipped only with one type of horn and anvil. Welding operation is thus simplified, and equipment costs are lowered.

The present invention is not limited to the above mentioned means and materials of the embodiments. The connector unit, through which extend the terminals of the bus bars welded with the flat cable, may be provided only for the rotor, such that the bus bar terminals are connected to the terminals of outside electrical cables, only at the rotor side. Alternatively, the connector unit may be provided only at the base-shell side.

As can be understood from above, the conductor elements of a flat cable, contained in a cable reel, are welded to bus bars. The other end portions of the bus bars are provided with corresponding terminals, which extend into a connector unit formed unitarily and in one piece with a rotor and/or a base shell. Subsequently, a terminal connected to the end portion of an outside electrical cable is inserted into the connector unit, and connected to the bus-bar terminal therein by fitting. Accordingly, when desired, electrical cables can be rearranged very easily, and the circuit can be modified very easily as well.

In the prior art, the conductor elements of a flat cable and of an electrical cable are welded to corresponding end portions of a bus bar. Accordingly, a welding machine must be equipped with different types of horn and anvil, incurring a higher production cost. In the present invention, the bus bars are welded only to the conductor elements of the flat cable, so that only one kind of horn and anvil is required for the manufacture of the cable reel structure. Operational costs are thus lowered, and operation efficiency is improved.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. 2000-112997, filed on Apr. 14, 2000, which is herein expressly incorporated by reference in its entirety.

What is claimed:

1. A cable reel structure comprising a fixed member, a mobile member mounted thereto, and a flat cable including conductor elements, an end portion of which is exposed, said cable reel structure being configured to receive an electrical cable having a cable terminal;

said cable real structure further comprising bus bars respectively having first and second end portions, said first end portion of each of said bus bars being fixed to a respective one of said conductor elements, said second end portion of each of said bus bars forming a bus-bar terminal; and at least one of said mobile member and said fixed member comprises a corresponding connector unit having an outward opening, and said bus-bar terminal extends into said connector unit, wherein said connector unit is configured to receive the cable terminal through said outward opening, such that the cable terminal can be connected to said bus-bar terminal and disconnected from said bus-bar terminal wherein said connector unit comprises a retainer configured to hold the cable terminal.

2. The cable reel structure according to claim 1, further comprising a torus-shaped enclosure defined by said fixed member and said mobile member mounted thereto in a freely rotatable manner, said torus-shaped enclosure containing the flat cable such that the flat cable can be wound or unwound in conjunction with the rotation of said mobile member.

3. The cable reel structure according to claim 2, wherein said bus bars are insert-molded in a resin material, and said first end portion of each of said bus bars is fixed to each respective one of said conductor elements of said flat cable by welding, such that said second end portion of each of said bus bars forms a bus-bar terminal which projects from said resin material.

4. The cable reel structure according to claim 3, wherein the electrical cable to be connected to said bus-bar terminal is an electrical cable incorporated in an airbag system.

5. The cable reel structure according to claim 2, wherein the electrical cable to be connected to said bus-bar terminal is an electrical cable incorporated in an airbag system.

6. The cable reel structure according to claim 1, wherein said bus bars are insert-molded in a resin material, and said first end portion of each of said bus bars is fixed to each respective one of said conductor elements of said flat cable by welding, such that said second end portion of each of said bus bars forms a bus-bar terminal which projects from said resin material.

7. The cable reel structure according to claim 6, wherein the electrical cable to be connected to said bus-bar terminal is an electrical cable incorporated in an airbag system.

8. The cable reel structure according to claim 1, wherein the electrical cable to be connected to said bus-bar terminal is an electrical cable incorporated in an airbag system.

9. The cable reel structure according to claim 1, wherein the electrical cable to be connected to said bus-bar terminal is an electrical cable incorporated in an airbag system.

10. A cable reel structure comprising a fixed member, a mobile member mounted thereto, and a flat cable including conductor elements, an end portion of which is exposed, said cable reel structure being configured to receive an electrical cable having a cable terminal;

said cable real structure further comprising bus bars respectively having first and second end portions, said first end portion of each of said bus bars being fixed to a respective one of said conductor elements, said second end portion of each of said bus bars forming a bus-bar terminal; and at least one of said mobile member and said fixed member comprises a corresponding connector unit having an outward opening, and said bus-bar terminal extends into said connector unit, wherein said connector unit is configured to receive the cable terminal through said outward opening, such that the cable terminal can be connected to said bus-bar terminal, and in combination with the cable terminal, wherein said bus-bar terminal is a tab-type male termimal, and said cable terminal is a female terminal press-fittable on the electrical cable.

11. The cable reel structure and cable terminal combination according to claim 10, wherein said bus bars are insert-molded in a resin material, and said first end portion of each of said bus bars is fixed to each respective one of said conductor elements of said flat cable by welding, such that said second end portion of each of said bus bars forms a bus-bar terminal which projects from said resin material.

12. The cable reel structure and cable terminal combination according to claim 10, wherein the electrical cable to be connected to said bus-bar terminal is an electrical cable incorporated in an airbag system.

13. A cable reel structure comprising a fixed member, a mobile member mounted thereto, and a flat cable including conductor elements, an end portion of which is exposed, said cable reel structure being configured to receive an electrical cable having a cable terminal;

said cable real structure further comprising bus bars respectively having first and second end portions, said first end portion of each of said bus bars being fixed to a respective one of said conductor elements, said second end portion of each of said bus bars forming a bus-bar terminal; and at least one of said mobile member and said fixed member comprises a corresponding connector unit having an outward opening, and said bus-bar terminal extends into said connector unit, wherein said connector unit is configured to receive the cable terminal through said outward opening, such that the cable terminal can be connected to said bus-bar terminal;

a torus-shaped enclosure defined by said fixed member and said mobile member mounted thereto in a freely rotatable manner, said torus-shaped enclosure containing the flat cable such that the flat cable can be wound or unwound in conjunction with the rotation of said mobile member, wherein said bus-bar terminal is a tab-type male terminal, and said cable terminal is a female terminal press-fitted on said electrical cable.

14. The cable reel structure according to claim 13, wherein said bus bars are insert-molded in a resin material, and said first end portion of each of said bus bars is fixed to each respective one of said conductor elements of said flat cable by welding, such that said second end portion of each of said bus bars forms a bus-bar terminal which projects from said resin material.

15. The cable reel structure according to claim 13, wherein the electrical cable to be connected to said bus-bar terminal is an electrical cable incorporated in an airbag system.

16. A cable reel structure comprising a fixed member, a mobile member mounted thereto, and a flat cable including conductor elements, an end portion of which is exposed, said cable reel structure being configured to receive an electrical cable having a cable terminal;

said cable real structure further comprising bus bars respectively having first and second end portions, said first end portion of each of said bus bars being fixed to a respective one of said conductor elements, said second end portion of each of said bus bars forming a bus-bar terminal; and at least one of said mobile member and said fixed member comprises a corresponding connector unit having an outward opening, and said bus-bar terminal extends into said connector unit, wherein said connector unit is configured to receive the cable terminal through said outward opening, such that the cable terminal can be connected to said bus-bar terminal, wherein said connector unit comprises a lance configured to hold the cable terminal.

17. The cable reel structure according to claim 16, wherein the electrical cable to be connected to said bus-bar terminal is an electrical cable incorporated in an airbag system.

18. A cable reel structure comprising a fixed member, a mobile member mounted thereto, and a flat cable including conductor elements, an end portion of which is exposed, said cable reel structure being configured to receive an electrical cable having a cable terminal;

said cable real structure further comprising bus bars respectively having first and second end portions, said first end portion of each of said bus bars being fixed to a respective one of said conductor elements, said second end portion of each of said bus bars forming a bus-bar terminal; and at least one of said mobile member and said fixed member comprises a corresponding connector unit having an outward opening, and said bus-bar terminal extends into said connector unit, wherein said connector unit is configured to receive the cable terminal through said outward opening, such that the cable terminal can be connected to said bus-bar terminal;

a torus-shaped enclosure defined by said fixed member and said mobile member mounted thereto in a freely rotatable manner, said torus-shaped enclosure containing the flat cable such that the flat cable can be wound or unwound in conjunction with the rotation of said mobile member, wherein said connector unit comprises a lance configured to hold the cable terminal.

19. A cable reel structure comprising a fixed member, a mobile member mounted thereto, and a flat cable including conductor elements, an end portion of which is exposed, said cable reel structure being configured to receive an electrical cable having a cable terminal;

said cable real structure further comprising bus bars respectively having first and second end portions, said first end portion of each of said bus bars being fixed to a respective one of said conductor elements, said second end portion of each of said bus bars forming a bus-bar terminal; and at least one of said mobile member and said fixed member comprises a corresponding connector unit having an outward opening, and said bus-bar terminal extends into said connector unit, wherein said connector unit is configured to receive the cable terminal through said outward opening, such that the cable terminal can be connected to said bus-bar terminal;

a torus-shaped enclosure defined by said fixed member and said mobile member mounted thereto in a freely rotatable manner, said torus-shaped enclosure containing the flat cable such that the flat cable can be wound or unwound in conjunction with the rotation of said mobile member, wherein said connector unit comprises a retainer configured to hold the cable terminal.

* * * * *

UNITED STATES PATENT AND TRADEMARK OFFICE
CERTIFICATE OF CORRECTION

PATENT NO. : 6,437,250 B2
DATED : August 20, 2002
INVENTOR(S) : S. Sugata

It is certified that error appears in the above-identified patent and that said Letters Patent is hereby corrected as shown below:

Column 5,
Line 36, "real" should be -- reel --.
Line 49, after "terminal" insert -- , --.

Column 6,
Lines 25 and 58, "real" should be -- reel --.

Column 7,
Line 30, "real" should be -- reel --.

Column 8,
Line 3, "real" should be -- reel --.
Line 29, "real" should be -- reel --.

Signed and Sealed this

Twenty-fifth Day of March, 2003

JAMES E. ROGAN
*Director of the United States Patent and Trademark Office*